(12) United States Patent
Kamiwatari et al.

(10) Patent No.: US 12,531,624 B2
(45) Date of Patent: Jan. 20, 2026

(54) CONTROL APPARATUS, USER EQUIPMENT, CONTROL METHOD, AND NON-TRANSITORY COMPUTER-READABLE STORAGE MEDIUM

(71) Applicant: KDDI CORPORATION, Tokyo (JP)

(72) Inventors: Shunsuke Kamiwatari, Fujimino (JP); Issei Kanno, Fujimino (JP); Takeo Ohseki, Fujimino (JP); Kosuke Yamazaki, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 18/814,961

(22) Filed: Aug. 26, 2024

(65) Prior Publication Data

US 2024/0421885 A1 Dec. 19, 2024

Related U.S. Application Data

(63) Continuation of application No. PCT/JP2023/006706, filed on Feb. 24, 2023.

(30) Foreign Application Priority Data

Feb. 28, 2022 (JP) .................................. 2022-030078

(51) Int. Cl.
*H04L 5/12* (2006.01)
*H04B 7/06* (2006.01)

(52) U.S. Cl.
CPC ....... *H04B 7/06952* (2023.05); *H04B 7/0632* (2013.01); *H04B 7/0639* (2013.01)

(58) Field of Classification Search
CPC . H04B 7/06952; H04B 7/0632; H04B 7/0639

(Continued)

(56) References Cited

U.S. PATENT DOCUMENTS

2016/0345216 A1 11/2016 Kishiyama et al.
2019/0327714 A1* 10/2019 Wang .................. H04B 7/0639
(Continued)

FOREIGN PATENT DOCUMENTS

| JP | 2015-164281 A | 9/2015 |
| JP | 2018-107613 A | 7/2018 |
| WO | WO-2018/173239 A1 | 9/2018 |

OTHER PUBLICATIONS

Kojima, Chikara, et al. "Novel Two-Step Beam Search Method for Multi User Millimeter-wave Communication" 2017 IEEE 28th Annual International Symposium on Personal, Indoor, and Mobile Radio Communications (PIMRC). IEEE, 2017 (6 pages).

(Continued)

*Primary Examiner* — Zewdu A Kassa
(74) *Attorney, Agent, or Firm* — Foley & Lardner LLP

(57) ABSTRACT

A control apparatus that controls beam search processing between dispersed communication apparatus and user equipment performs: instructing to transmit first reference signals using first beams; obtaining first feedback information including a combination of identification information of one or more first beams and received signal strength; if a predetermined number or greater of identification information of different first beams is included in the first feedback information obtained from the user equipment, determining first beams of a number fewer than the predetermined number to use in measuring second reference signals from among first beams of the predetermined number or greater; and reporting a parameter of the second reference signals transmitted using second beams that correspond to the first beam determined to use in measuring and that have a narrower beam width than the first beams.

14 Claims, 14 Drawing Sheets

(58) Field of Classification Search
USPC ................ 375/262, 260, 259, 219, 295, 316
See application file for complete search history.

(56) References Cited

U.S. PATENT DOCUMENTS

| | | |
|---|---|---|
| 2019/0349063 A1 | 11/2019 | Takano |
| 2020/0099437 A1 | 3/2020 | Harada et al. |
| 2021/0120529 A1 | 4/2021 | Park et al. |
| 2021/0211957 A1 | 7/2021 | Kamohara et al. |

OTHER PUBLICATIONS

Wang, Zihuan, et al. "Hybrid Beamforming Design for C-RAN Based mmWave Cell-Free Systems." 2020 IEEE 92nd Vehicular Technology Conference (VTC2020-Fall), IEEE, 2020 (5 pages).
EP Search Report for EP Appl. Ser. No. 23760097 dated Apr. 16, 2025 (12 pages).

* cited by examiner

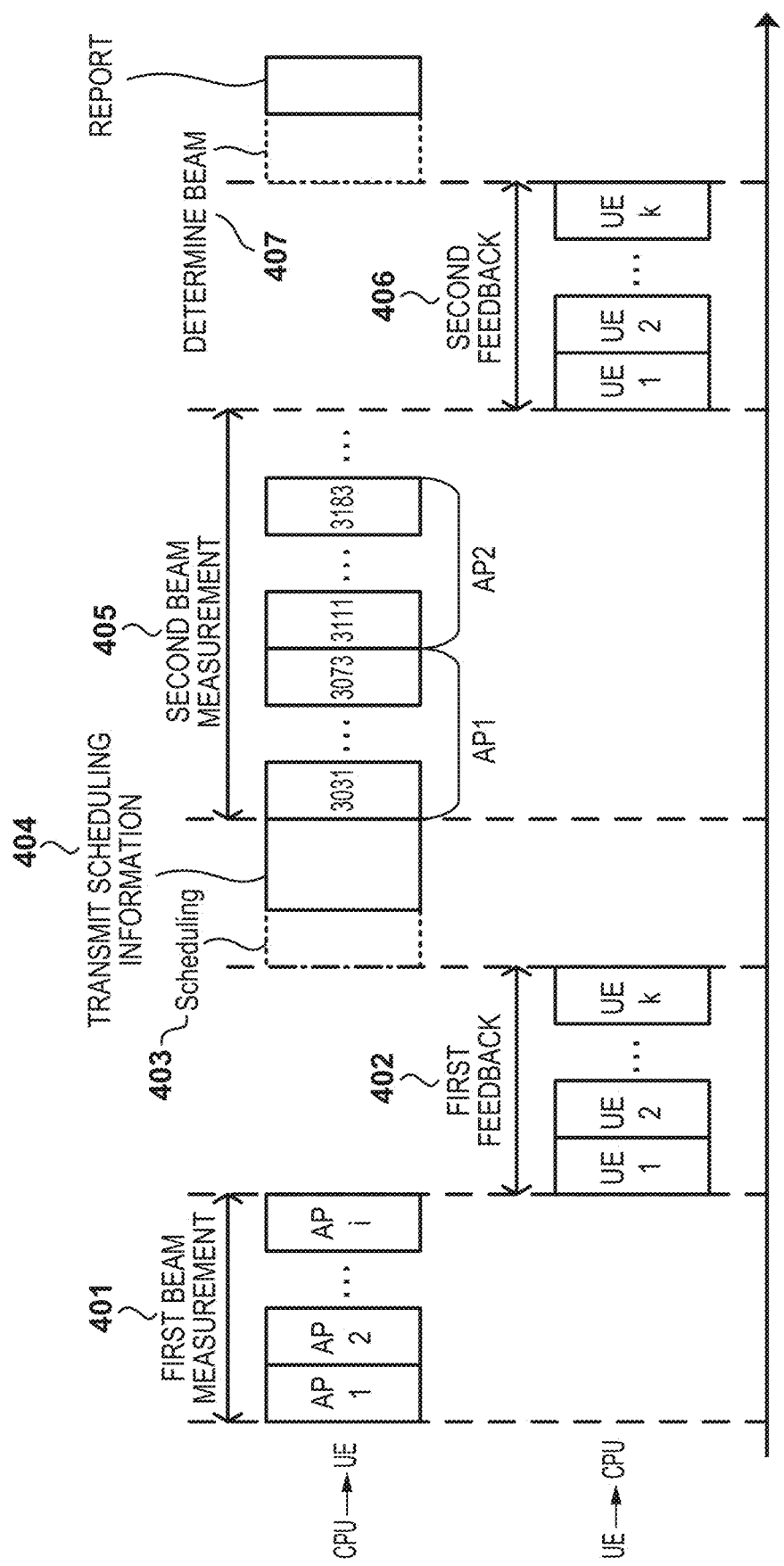

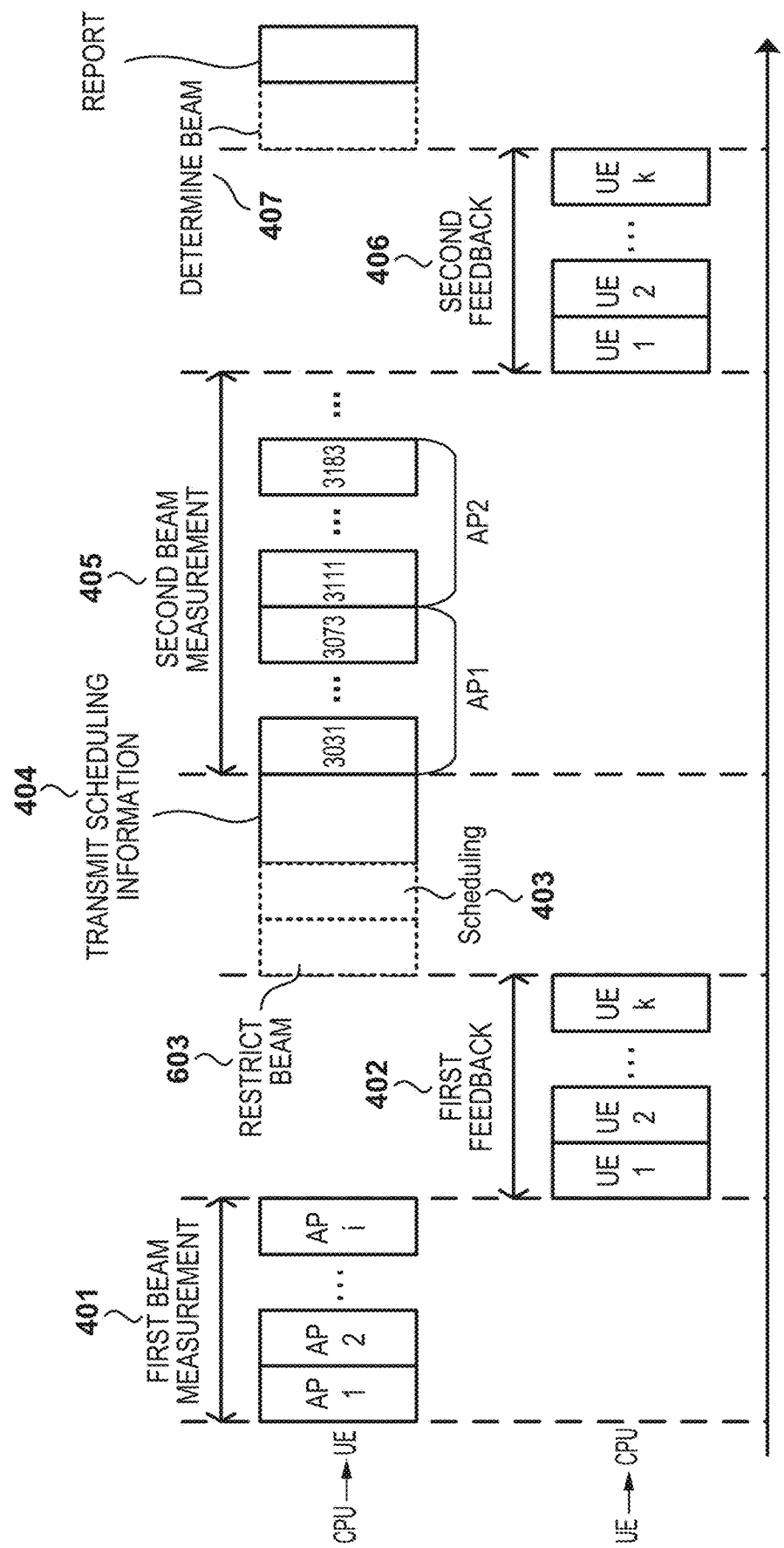

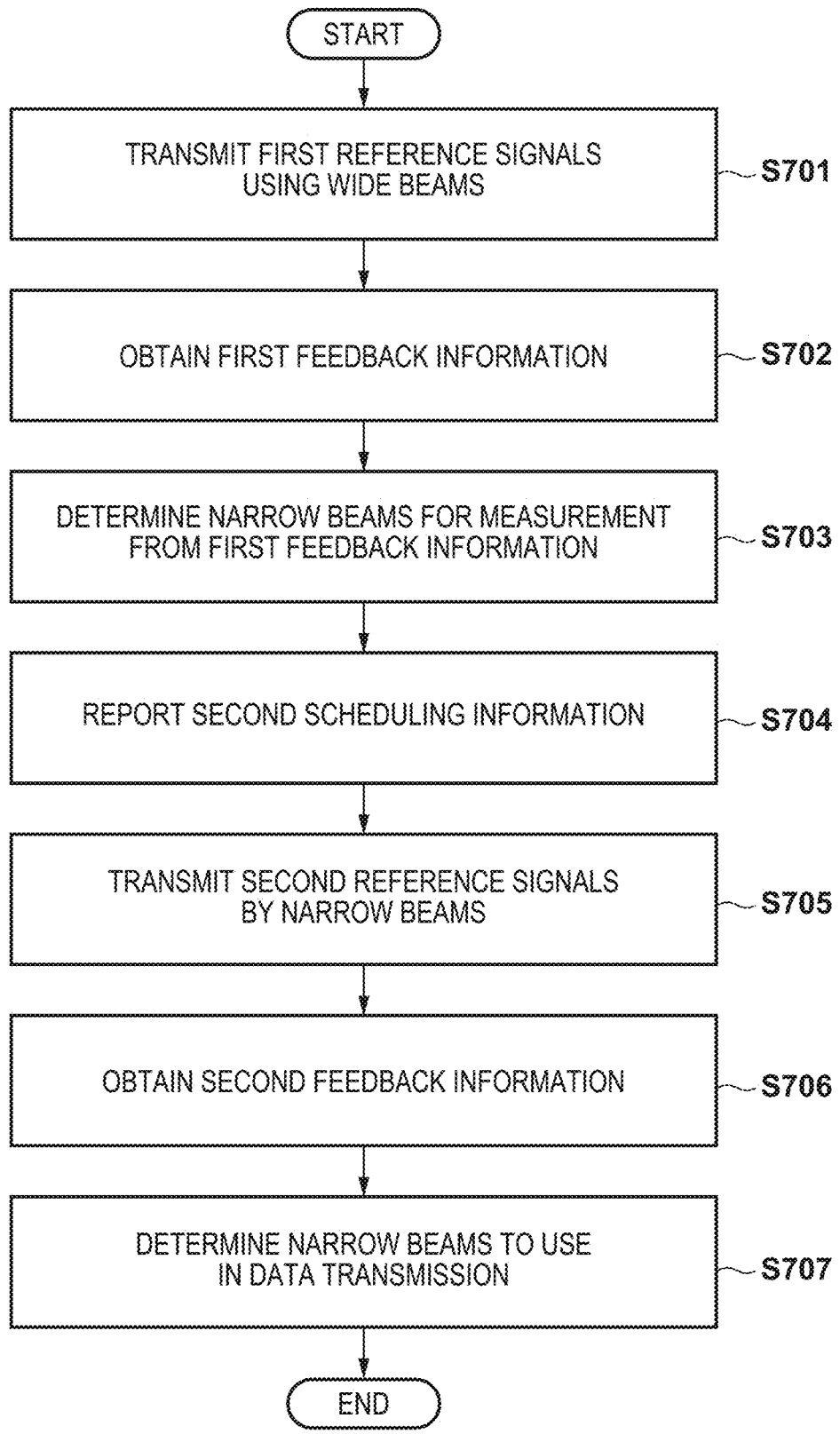

CONTROL APPARATUS, USER EQUIPMENT, CONTROL METHOD, AND NON-TRANSITORY COMPUTER-READABLE STORAGE MEDIUM

CROSS-REFERENCE TO RELATED APPLICATION(S)

This application is a continuation of International Patent Application No. PCT/JP2023/006706 filed on Feb. 24, 2023, which claims priority to and the benefit of Japanese Patent Application No. 2022-030078 filed on Feb. 28, 2022, the entire disclosures of which are incorporated herein by reference.

TECHNICAL FIELD

The present invention relates to a control apparatus, user equipment, a control method, and a non-transitory computer-readable storage medium.

BACKGROUND ART

Research into techniques for implementing a user-centric network has looked in a cell-free (CF) multiple-input multiple-output (MIMO) technique that is connected to a central control station using an optical fronthaul and communicates with a piece of user equipment (UE) via a plurality of access points (AP) disposed in an area (NPL 1).

With a CF MIMO technique, it is assumed that a plurality of APs are disposed in the area. Thus, compared to a known cellular network, the number of APs with a possibility of sending a wireless signal to a predetermined UE may be increased. Also, with a CF MIMO technique, wireless signals are exchanged between the UE and different APs per data stream and it may connect to a central control station. Thus, the number of APs performing channel estimation between a predetermined UE may be increased compared to known MIMO techniques.

CITATION LIST

Patent Literature

NPL1: Wang, Zihuan, et al. "Hybrid Beamforming Design for C-RAN Based mmWave Cell-Free Systems." 2020 IEEE 92nd Vehicular Technology Conference (VTC2020-Fall), IEEE, 2020.

NPL2: Kojima, Chikara, et al. "Novel two-step beam search method for multi user millimeter-wave communication" 2017 IEEE 28th Annual International Symposium on Personal, Indoor, and Mobile Radio Communications (PIMRC). IEEE, 2017.

SUMMARY OF THE INVENTION

Technical Problem

It is necessary to execute beam search processing (NPL2) to search for beams between the APs and the UE to use in communication between the APs and the UE and to perform channel estimation using the found beam. However, as the number of APs that may exchange wireless signals with the UE is increased, a longer amount of time is needed for the beam search processing to identify the APs for the central control station to use in communication with the UE.

In light of the foregoing, the present invention enables realization of a technique that can reduce the amount of time taken for beam search processing in a cell-free MIMO technique.

Solution to Problem

To solve the problem described above, a control apparatus that controls beam search processing between a dispersed plurality of communication apparatus and a plurality of user equipment, the control apparatus comprising: first instructing unit configured to instruct a communication apparatus to transmit a plurality of first reference signals using different parameters using a plurality of first beams formable by the apparatus; first obtaining unit configured to obtain, from each of the plurality of user equipment, first feedback information including a combination of identification information of one or more first beams and received signal strength in order of highest received signal strength of the first reference signals for each of the plurality of user equipment from among the plurality of first beams used in transmission of the first reference signals by the communication apparatus; first determining unit configured to, in a case where a predetermined number or greater of identification information of different first beams is included in a plurality of the first feedback information obtained from the plurality of user equipment by the first obtaining unit, determine first beams of a number fewer than the predetermined number to use in measuring second reference signals from among first beams of the predetermined number or greater; and first reporting unit configured to report, to the plurality of user equipment, a parameter of the second reference signals transmitted using a plurality of second beams that correspond to the first beam of a number fewer than the predetermined number determined to use in measuring by the first determining unit and that have a narrower beam width than the first beams.

Advantageous Effects of Invention

According to the present invention, a technique can be provided that can reduce the amount of time taken for beam search processing in a cell-free MIMO technique.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 4 is a diagram illustrating an example of the schedule of known beam search processing.

FIG. 6 is a diagram illustrating an example of the schedule of beam search processing according to the present embodiment.

FIG. 7 is a diagram illustrating an example of processing executed by the central processing unit according to the present embodiment.

DESCRIPTION OF THE EMBODIMENTS

Figure 1:
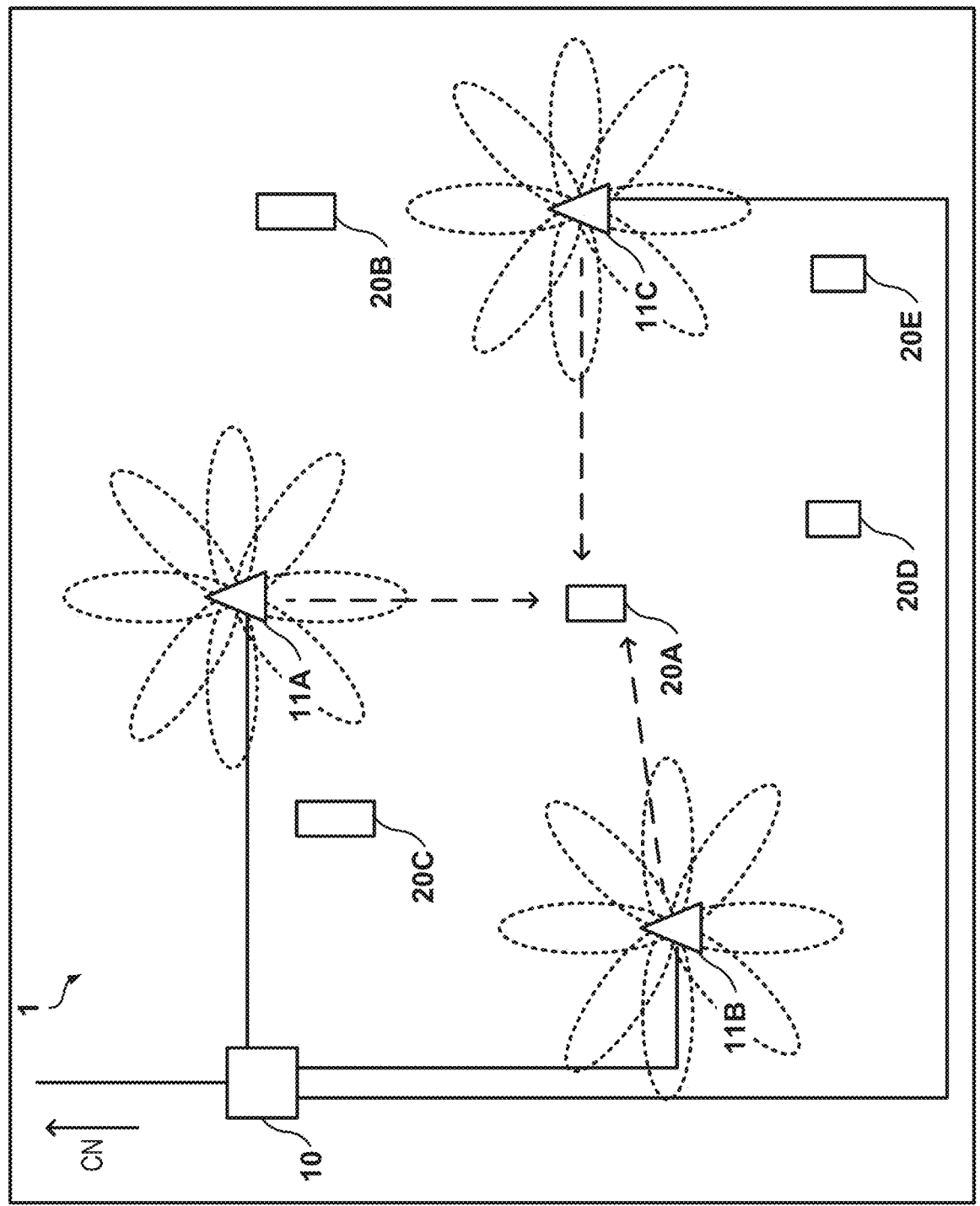
FIG. 1 is a diagram illustrating a wireless communication system according to a present embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

System Configuration

FIG. 1 illustrates an example of the configuration of a wireless communication system according to the present embodiment. A wireless communication system 1 is a 5G cellular communication system (mobile communication network), for example. However, no such limitation is intended, and the system of the present embodiment may be a cellular communication system of a 5G successor or a non-cellular wireless communication system. The present system may include a central processing unit 10, access points (APs) 11A to 11C (also referred to below without distinction as AP 11), and user equipment (UE) 20A to 20E (also referred to below without distinguish as UE 20). Note that in FIG. 1, three APs 11 and five UEs 20 are illustrated, but the number of apparatuses are not limited thereto.

The wireless communication system 1 according to the present embodiment performs MIMO communication between the central processing unit 10 and the UEs 20 via the APs 11 that are dispersed in the service area in which the central processing unit 10 provides a service and that are controlled by the central processing unit 10. By the central processing unit 10 making the APs 11 cooperate in operations, as in a known wireless communication system, a decrease in communication quality due to the positional relationship between the central processing unit 10 and the UEs 20 can be prevented, and the UEs 20 can receive a communication service of at least a constant quality anywhere in the service area. Such cell-free (CF) MIMO techniques are currently being researched.

The central processing unit 10 according to the present embodiment is a control apparatus that performs overall control of the APs 11. Note that in the present embodiment described herein, millimeter waves are used in the wireless communication between the APs 11 and the UEs 20. The central processing unit 10 communicates with the UEs 20 via the APs 11 connected via an optical fronthaul. Also, by connecting to a core network, the UEs 20 can be provided with internet access.

The APs 11 are exchange points that are connected to the central processing unit 10 via the optical fronthaul and that exchange wireless signals according to instructions from a base station. The APs 11 each include a plurality of antennas and can perform beamforming according to control by the central processing unit 10.

Configuration of Central Processing Unit

Figure 2A:
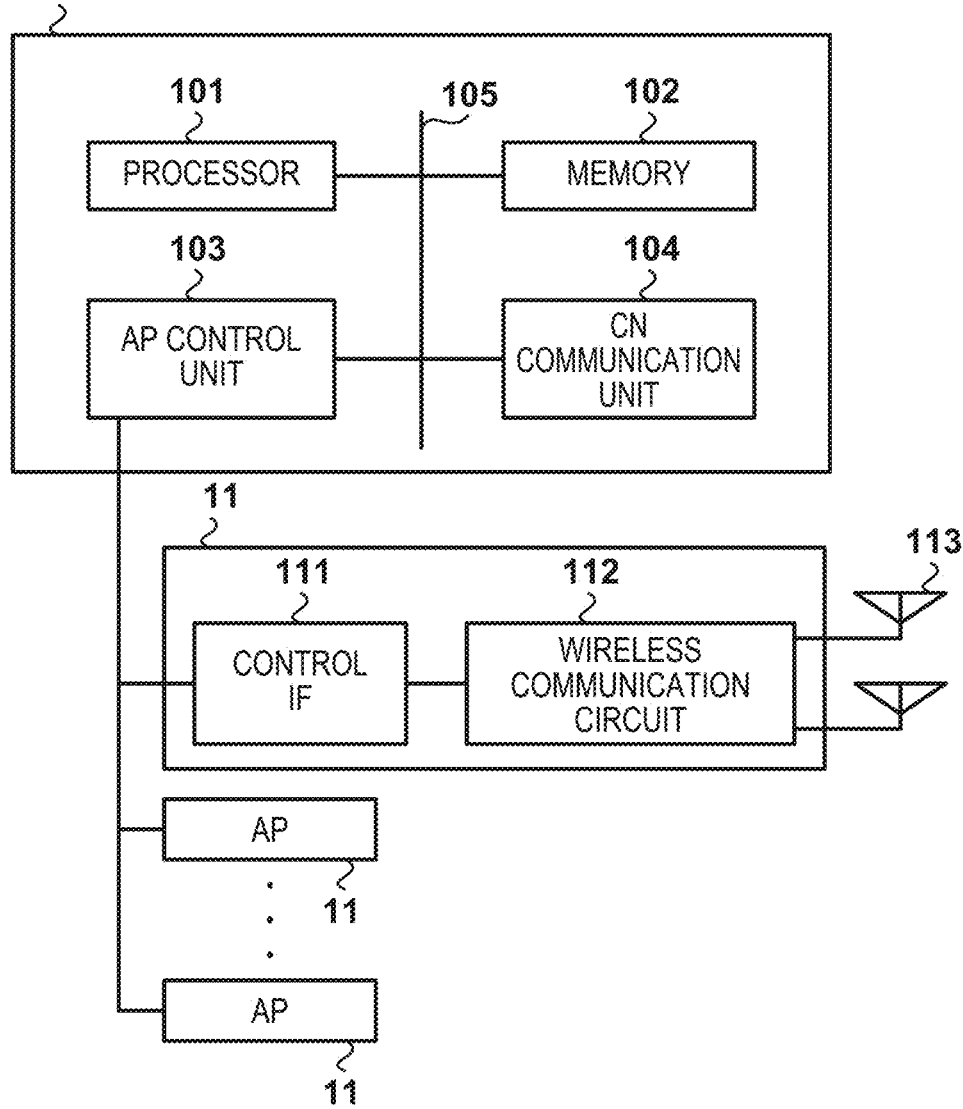
FIG. 2A is a diagram illustrating the configuration of a central processing unit and an access point.

The configuration of the central processing unit 10 and the AP 11 will now be described with reference to FIG. 2A.

The central processing unit 10 includes a processor 101, a memory 102, an AP control unit 103, and a core network (CN) communication unit 104 communicatively connected to one another via a bus 105.

The processor 101 is a control unit that executes a program stored in the memory 102 and controls the entire operations of the central processing unit 10. The processor 101 may be one or more processors including a central processing unit (CPU), an application specific integrated circuit (ASIC), a field-programmable gate array (FPGA), a digital signal processor (DSP), and the like. The memory 102 is a storage unit that stores programs executed by the processor 101 and various types of data used by the processor 101 to control the central processing unit 10. For example, the central processing unit 10 includes a computer including the processor 101 and the memory 102.

The AP control unit 103 is an interface (IF) for performing control of the APs 11. The AP control unit 103 transmits data streams to be transmitted to the UEs 20 to the APs 11 and receives data streams from the UEs 20 via the APs 11. In the present embodiment, the AP control unit 103 is an IF that communicates with the APs 11 via an optical fronthaul.

The CN communication unit 104, which the central processing unit 10 uses for communication, is a wired or wireless communication unit that communicates with the core network.

The AP 11 is a remote radio head (RRH) that outputs a signal transmitted from the central processing unit 10. The AP 11, together with a signal received from the AP control unit 103, transmits a signal received from the UE 20 to the AP control unit 103 via a control IF 111. Also, the transmitting and receiving of signals by the APs 11 is controlled by the central processing unit 10 via the control interface (IF) 111. The data instructing for transmission from the central processing unit 10 is transmitted via wireless signal via at least one of the plurality of antennas 113 via a wireless communication circuit 112 to form a beam. The central processing unit 10 can instruct a specific UE 20 to perform data transmission using a plurality of beams formable by the APs 11 to perform CF MIMO transmission. Also, the central processing unit 10 can simultaneously transmit wireless signals to one of the UEs 20 from the plurality of APs 11, to the plurality of UEs 20 from one AP 11, and to the plurality of UEs 20 from the plurality of APs 11.

Configuration of User Equipment

Figure 2B:
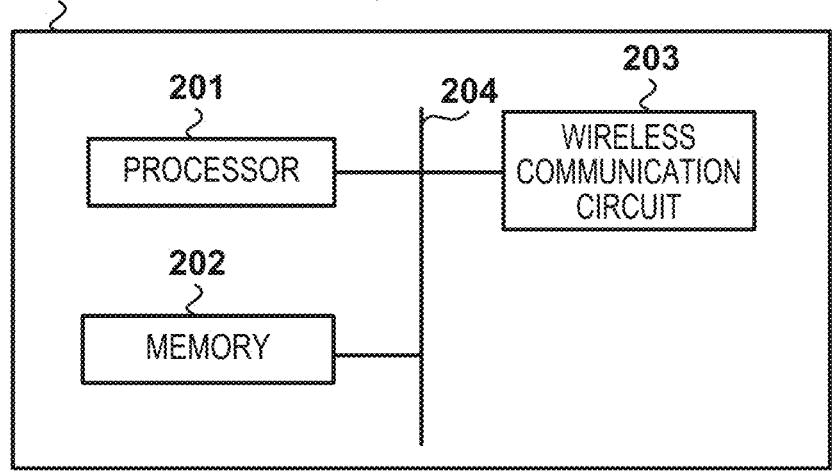
FIG. 2B is a diagram illustrating the configuration of a user equipment.

The configuration of the user equipment (UE) 20 will now be described with reference to FIG. 2B. The UE 20 includes a processor 201, a memory 202, and a wireless communication circuit 203 communicatively connected to one another via a bus 204.

The processor 201 is a control unit that executes a program stored in the memory 202 and controls the entire operations of the UE 20. The processor 201 may be one or more processors including a central processing unit (CPU), an application specific integrated circuit (ASIC), a field-programmable gate array (FPGA), a digital signal processor (DSP), and the like. The memory 202 is a storage unit that stores programs executed by the processor 201 and various types of data used by the processor 201 to UE 20.

The wireless communication circuit 203 is a wireless circuit for exchanging wireless signals with the APs 11 and is connected to one or more antennas. The UE 20 according to the present embodiment executes beam search processing to measure beams used in MIMO communication with the APs 11, as described below. A plurality of beams with a low correlation and good signal quality are detected via beam search processing, and by transmitting and receiving data on streams allocated to the plurality of beams, the throughput between the UEs 20 and the central processing unit 10 can be improved. Note that in the present embodiment described herein, the antenna directionality of the UEs 20 is non-directional. However, UEs 20 with different directionality may be used.

Beam Selection Processing

Next, known beam search processing will be described with reference to FIGS. 3A, 3B, and 4.

An overview of beams measured via beam search will now be described with reference of FIGS. 3A and 3B. Beam search processing includes a two-step measurement including a first beam measurement (rough measurement) in which the UEs 20 measure first beams as illustrated in FIG. 3A and a second beam measurement (fine measurement) in which second beams with a smaller beam width that the first beams are measured as illustrated in FIG. 3B. The first beams may be referred to as wide beams, and the second beams may be referred to as narrow beams. The wide beams may be formed by a combination of a plurality of narrow beams, for example. In one example, the wide beams may be formed by the simultaneous transmission of the same reference signal using a plurality of narrow beams.

Note that the central processing unit 10 broadcasts an index of wide beams used by the APs 11 to transmit the reference signal and schedule information (first schedule information) relating to indexing timing as the schedule of the first beam measurement. The UEs 20 identify the timing of the transmission of the wide beams to be measured by obtaining the broadcast schedule information of the first beam measurement. Also, the schedule information includes information designating a resource for the UEs 20 to report the best beam of the wide beams in a time period 402 of FIG. 4. This allows a collision of feedback reports from the UEs 20 to be avoided. Note that the UEs 20 transmit feedback reports to the central processing unit 10 using a control channel via any of the APs 11.

In the first beam measurement of a time period 401 of FIG. 4, the reference signal is transmitted from the APs 11 in order using a predetermined number of wide beams with a larger beam width than the narrow beams, the UEs 20 measure the received signal strength of the reference signals transmitted using the wide beams, and the wide beam used in transmitting the reference signal with the highest received signal strength from among the wide beams transmitted from the APs 11 is reported as the best wide beam. For example, in the time period 401 of FIG. 4, as illustrated in FIG. 3A, the reference signal is transmitted via wide beams 301 to 308 of the AP 11A, wide beams 311 to 318 of the AP 11B, and wide beams 321 to 328 of the AP 11C. The UEs 20 measure the received signal strength of the reference signal transmitted using the wide beams formable by the APs 11 and determine the beam measured to have a reference signal with the highest received signal strength to be the best wide beam. In one example, the UEs 20 may determine the beam measured to have a reference signal with the highest signal-to-noise ratio (SN ratio) as the best wide beam.

In this example, the UE 20A determines the wide beams 307, 318, and 328 to be best wide beams, the UE 20B determines the wide beams 306 and 326 to be the best wide beams, and the UE 20C determines the wide beams 303 and 311 to be the best wide beams. Also, the UE 20D determines the wide beams 305, 317, and 322 to be the best wide beams, and the UE 20E determines the wide beams 304, 316, and 323 to be the best wide beams.

Figure 11:
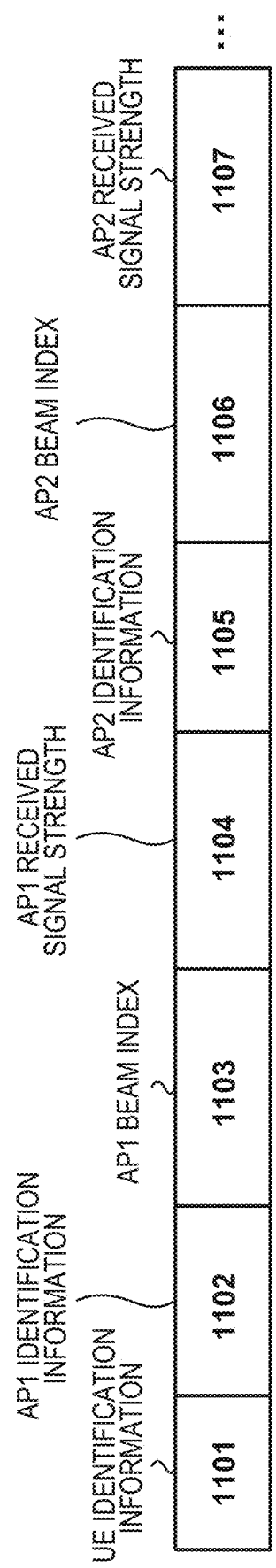
FIG. 11 is a diagram illustrating a message structure of a feedback report according to the present embodiment.

Next, in the time period 402 of FIG. 4, feedback of the best wide beams determined in the time period 401 is performed by the UEs 20. As illustrated in FIG. 11, the feedback information (feedback report) includes, as parameters, identification information 1101 of the UEs 20, identification information 1102 of the first APs 11, a beam index 1103 used in transmission of the reference signal with the highest received signal strength from among the reference signals from the first APs 11, and a highest received signal strength 1104 from among the reference signals received from the first APs 11. Also, for other APs 11, a combination of identification information, a beam index of the best wide beams, and received signal strength may be included as indicated by 1105 to 1107. Note that in the present embodiment described herein, only the highest received signal strength per AP is reported. However, a combination of a beam index and received signal strength of two or more received signal strengths may be reported in order per AP. The beam indices 1103 and 1106 are identification information of the wide beam used in the transmission of the reference signal by the APs 11.

The central processing unit 10 instructs the APs 11 to transmit narrow beams obtained by dividing the wide beams of the indices designated by the feedback reports on the basis of the feedback reports of the best wide beams. Also, in a time period 403 of FIG. 4, a schedule of the second beam measurement for the UEs 20 is set. Accordingly, the UEs 20 can identify the timing to transmit a second reference signal using narrow beams corresponding to the wide beams of the APs 11 reported to the central processing unit 10 as the best wide beams at the UEs 20. Then, schedule information (second schedule information) designating the parameters transmitted by the reference signal in the second beam measurement is broadcast to the UEs 20. Note that in one example, the central processing unit 10 may unicast the second schedule information.

Figure 3A:
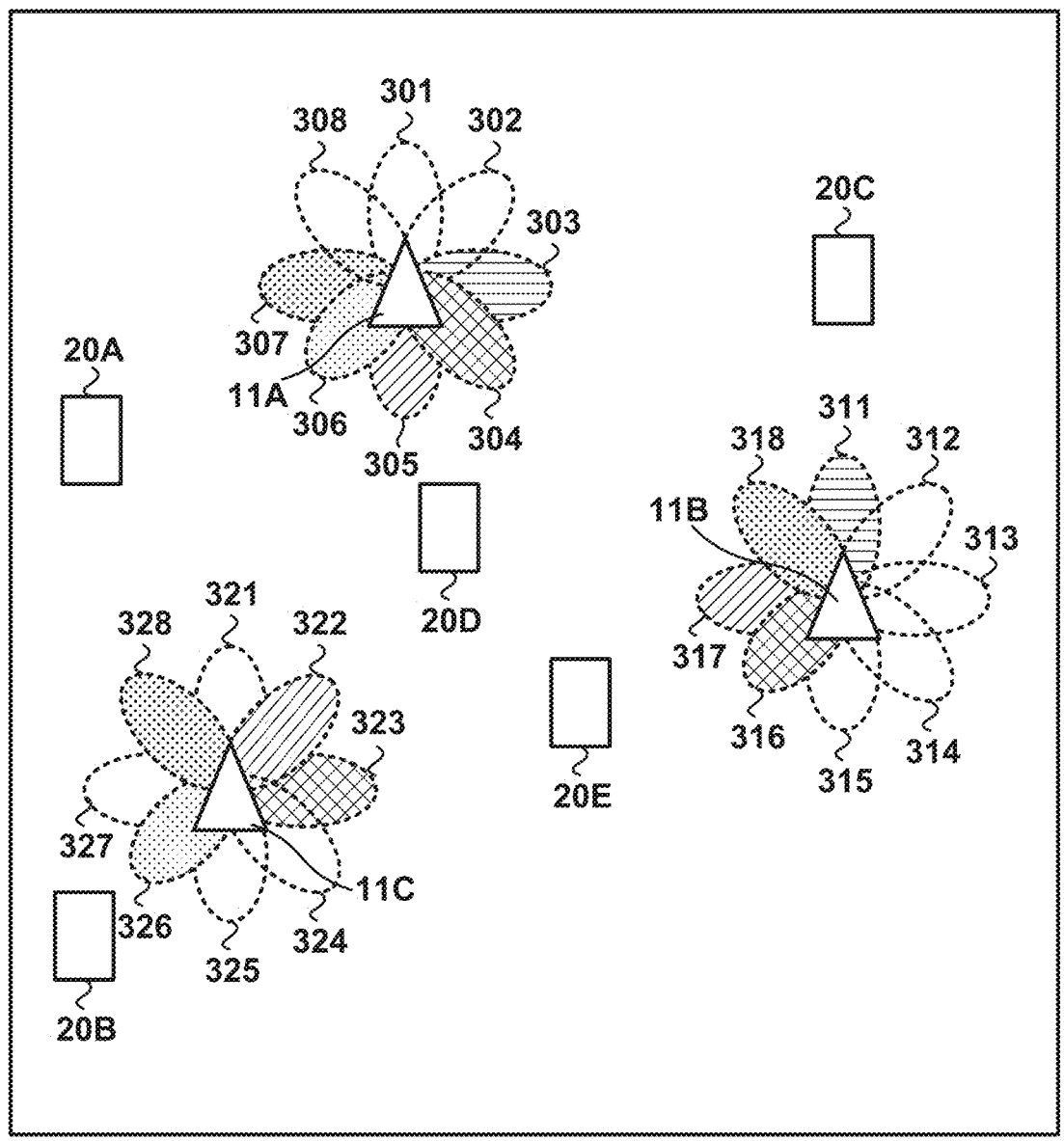
FIG. 3A is a diagram illustrating known one-stage beam selection.
Figure 3B:
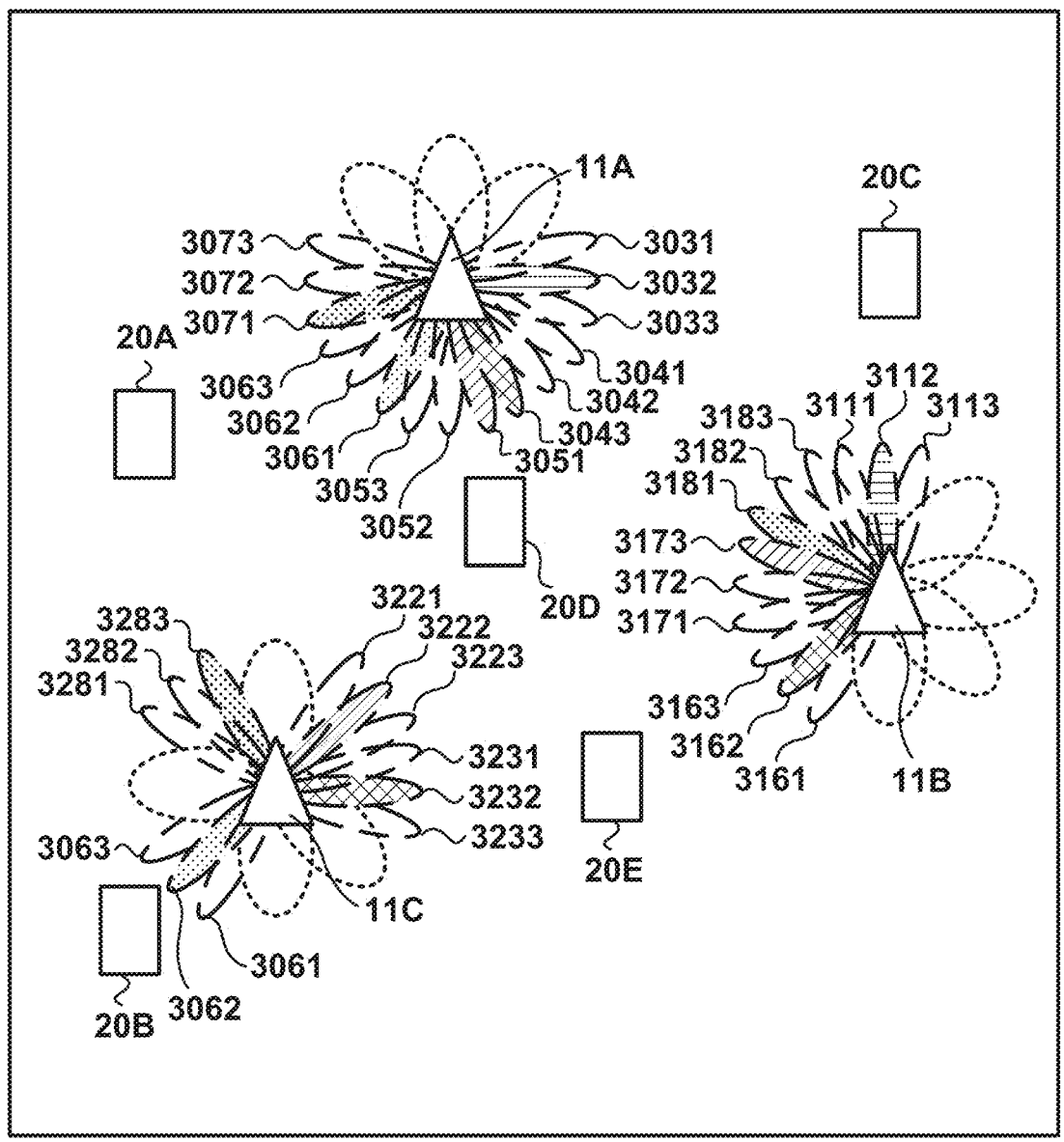
FIG. 3B is a diagram illustrating known two-stage beam selection.

Thus, in a time period 405 of FIG. 4, as illustrated in FIG. 3B, the second reference signal is transmitted by the AP 11A via narrow beams 3031 to 3033 corresponding to the wide beam 303, narrow beams 3041 to 3043 corresponding to the wide beam 304, narrow beams 3051 to 3053 corresponding to the wide beam 305, narrow beams 3061 to 3063 corresponding to the wide beam 306, and narrow beams 3071 to 3073 corresponding to the wide beam 307. In a similar manner, the second reference signal is transmitted by the AP 11B via narrow beams 3111 to 3113 corresponding to the wide beam 311, narrow beams 3161 to 3163 corresponding to the wide beam 316, narrow beams 3171 to 3173 corresponding to the wide beam 317, and narrow beams 3181 to 3183 corresponding to the wide beam 318. In a similar manner, the reference signal is transmitted by the AP 11C via narrow beams 3221 to 3223 corresponding to the wide beam 322, narrow beams 3231 to 3233 corresponding to the wide beam 323, narrow beams 3261 to 3263 corresponding to the wide beam 326, and narrow beams 3281 to 3283 corresponding to the wide beam 328. In a similar manner to the wide beams, the UEs 20 measure the received signal strength of the second reference signal transmitted from the APs 11 and determine the narrow beam used in the transmission of the reference signal with the highest received signal strength to be the best narrow beam. In one example, the UEs 20 may determine the beam measured to have a reference signal with the highest signal-to-noise ratio (SN ratio) as the best narrow beam.

In this example, the UE 20A determines the narrow beams 3071, 3181, and 3283 to be the best narrow beams, and the UE 20B determines the narrow beams 3061 and 3262 to be the best narrow beams. Also, the UE 20C determines the narrow beams 3032 and 3112 to be the best narrow beams, the UE 20D determines the narrow beams 3051, 3173, and 3222 to be the best narrow beams, and the UE 20E determines the narrow beams 3043, 3162, and 3232 to be the best narrow beams.

Next, in a time period 406 of FIG. 4, feedback of the best narrow beams determined in the time period 405 is performed by the UEs 20. Accordingly, the central processing unit 10 learns what beams to use for communication with each UE 20. Note that feedback information (second feedback information) to be transmitted in the time period 406 may also use a structure similar to that illustrated in FIG. 11. In other words, the identification information of the narrow beams used in the transmission of the second reference signal by the APs 11 and the received signal strength may be transmitted to the central processing unit 10 as the second feedback information.

In this example, in CF MIMO, the number of the UEs 20 that can communicate with the APs 11 is higher than that in known MIMO communication. Thus, with this increase in the number of the UEs 20, the number of narrow beams needed to be transmitted per AP 11 is also increased. This results in a problematic decrease in the effect of reducing the number of sweeps by two-stage beam selection. Also, there is an issue in CF MIMO that since a large number of the APs 11 are dispersed in the service area, the number of APs 11 is increased.

In CF MIMO using millimeter waves for the purpose of improving throughput, compared to wireless signals of a lower frequency, millimeter wave signals are greatly affected by distance attenuation. Thus, the APs 11 need to be disposed in a high density in the service area, again leading to the issue of an increase in the number of APs 11.

In the wireless communication system 1 according to the present embodiment, by restricting the beam number of the APs 11 that the UEs 20 measure, the amount of time taken for beam selection is reduced.

Next, the flow of beam selection according to the present embodiment will be described.

Figure 5A:
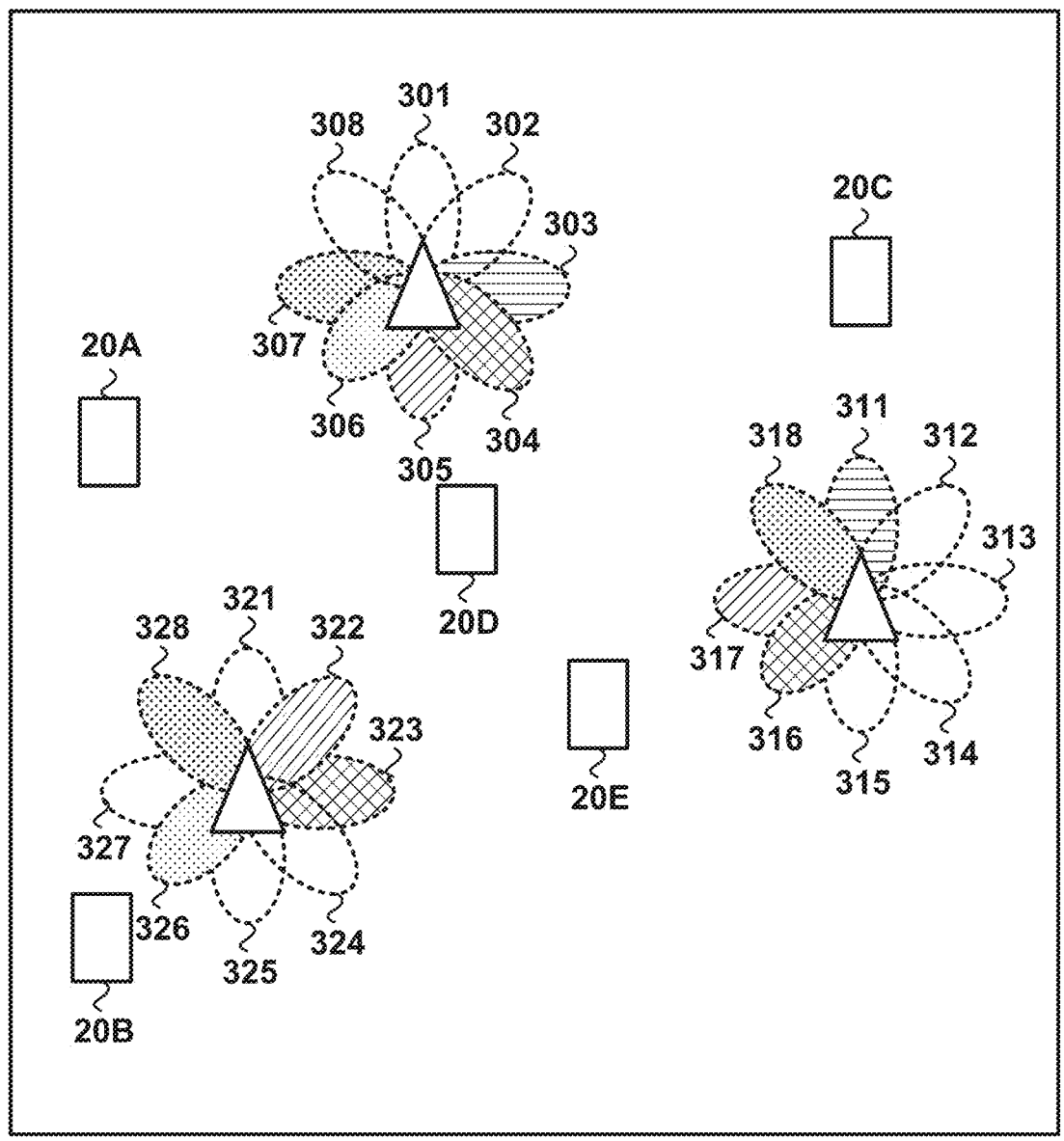
FIG. 5A is a diagram illustrating one-stage beam selection according to the present embodiment.

FIG. 5A is similar to FIG. 3A and thus will not be described. This also applies to the feedback from the UEs 20 in the time period 402 of FIG. 6.

Next, in a time period 603 of FIG. 6, the central processing unit 10 restricts the number of the beams of the APs 11 to be measured by the UEs 20 in the second beam measurement, performs scheduling in the time period 403, and reports the information of the beams of the APs 11 to be measured to the UEs 20 in a time period 404.

For example, the central processing unit 10 determines in the time period 603 to measure the narrow beams from the APs 11 that transmitted a predetermined number of wide beams in order from greatest signal strength, which is a signal strength equal to or greater than a threshold, from among the wide beams with feedback in the time period 402 from the UEs 20.

Figure 5B:
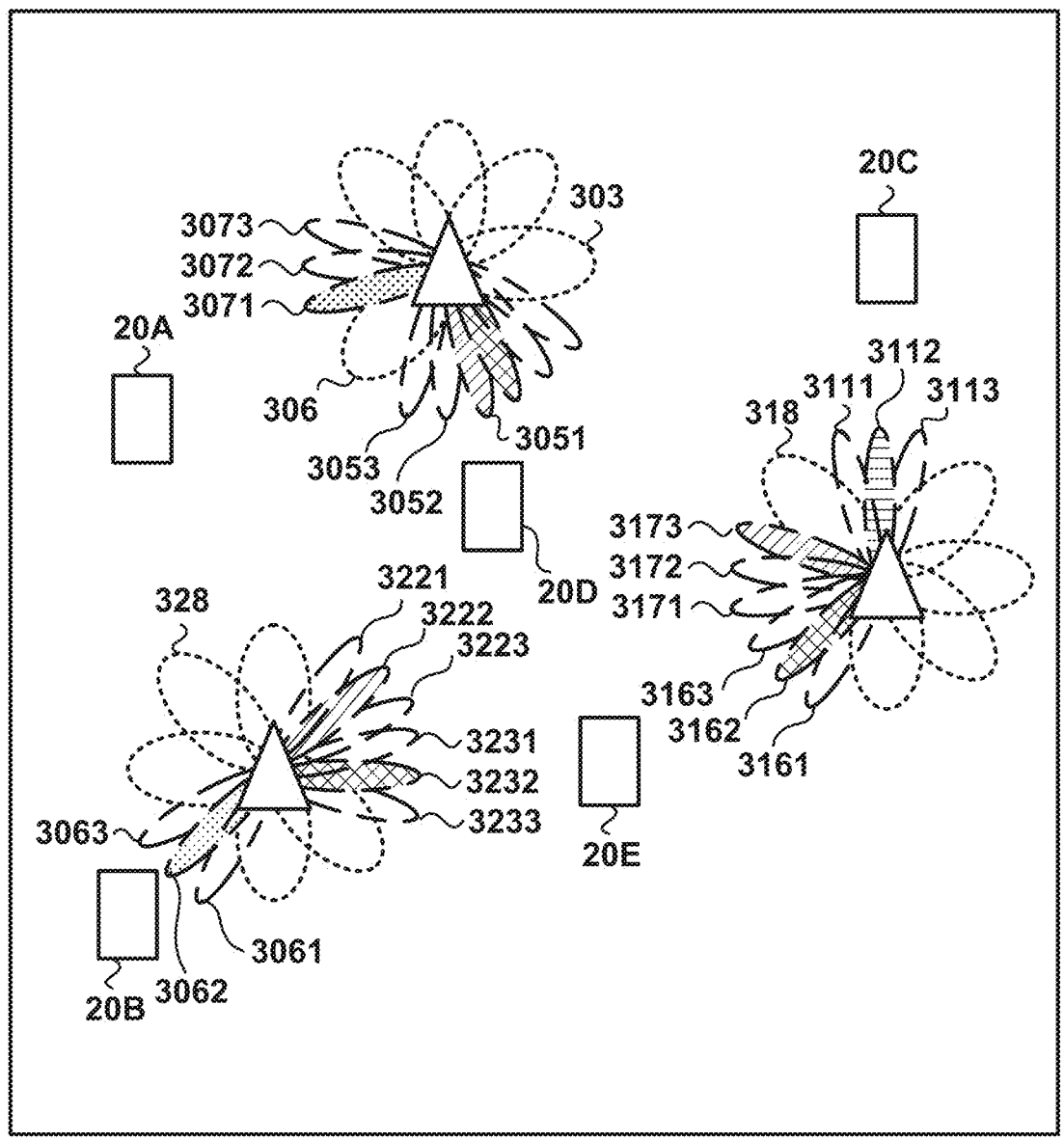
FIG. 5B is a diagram illustrating two-stage beam selection according to the present embodiment.

Thus, in the time period 603, the number of narrow beams to be measured by each UE 20 in the time period 405 can be reduced. For example, in the example illustrated in FIG. 5B, the central processing unit 10 determines to measure the narrow beams obtained by dividing three or less wide beams per AP 11. For example, the wide beams 303, 306, 318, and 328 are reported to be best wide beams from the UEs 20, but in the second beam measurement, measurement of the reference signals using the narrow beams corresponding to the wide beams 303, 306, 318, and 328 is not performed. Thus, the length of the second beam measurement period can be reduced while leaving narrow beams that can be used in communication. The processing of restricting the beam number to be measured in the second beam measurement by the central processing unit 10 will be described below in detail with reference to FIG. 7.

Processing Example

Next, an example of the processing executed by the central processing unit 10 according to the present embodiment will be described with reference to FIG. 7. The processing illustrated in FIG. 7 is implemented by the processor 101 of the central processing unit 10 executing a program stored in the memory 102.

Note that separate from the processing illustrated in FIG. 7, the central processing unit 10 broadcasts first schedule information relating to the schedule of beam transmission in a predetermined time interval and a feedback condition instructing of feedback timing. Also, the first schedule information may include the number of wide beams to be measured and the reference signal transmission interval, and the feedback condition may include information instructing of a threshold for the signal strength of wide beam fed back by the UEs 20.

First, in S701, the central processing unit 10 transmits the reference signal using the wide beams (first beams) via the APs 11 at the timing reported in advance by the UEs 20. The number of sweeps required if $N_{bml} \times L$, where $N_{bml}$ is the number of wide beams formable by each AP 11 and L is the number of APs 11.

Next, in S702, the central processing unit 10 receives first feedback information from the UEs 20. For example, the first feedback information includes a combination of an index of the best wide beams and the received signal strengths of the reference signals in the index, as described with reference to FIG. 11. The number of combinations of the index of the best wide beams and the received signal strengths of the reference signals in the index included in the first feedback information may be included in the feedback condition. Alternatively, the UE 20 may report the received signal strengths of reference signals of equal to or greater than a predetermined received signal strength threshold and a beam index used in the transmission of the reference signals.

Next, in S703, the central processing unit 10 determines whether to transmit the reference signals using the narrow beams from the APs 11 on the basis of the first feedback information received from the UEs 20. For example, as described above, per AP 11, the central processing unit 10 may select a predetermined number of wide beams or less, for example, less than four predetermined UEs 20, in order of highest received signal strength of the first feedback information and transmit the reference signals using the narrow beams corresponding to the selected wide beams. Alternatively, less wide beams than a predetermined number may be selected in order of highest average value of the received signal strength of a plurality of first feedback information from the plurality of APs 11.

Also, for example, the central processing unit 10 adds together the received signal strengths of the wide beams at the UEs 20 for each index of specific wide beams of the specific APs 11 included in the feedback information received from the UEs 20. Thus, in a case where feedback includes the same wide beams of the same APs 11 being the best wide beams from a plurality of the UEs 20, the summed received signal strength of the wide beams is increased. Also, for each index of the specific wide beams of the specific APs 11 included in the feedback information, measurement of the narrow beams corresponding to the wide beam in order from the lowest summed received signal strength is determined to not be performed in the second beam measurement. Thus, from among the wide beams reported to be the best wide beams from a larger number of the UEs 20, the narrow beams corresponding to wide beams with a higher received signal strength can be preferentially measured in the second beam measurement.

Also, the central processing unit 10 may perform the second measurement for the wide beam of the AP 11 indicating the highest received signal strength from among the best wide beams for each of the UEs 20 from among the received feedback information. Then, for each beam index of the APs 11 other than the beam of the AP 11 indicating the highest received signal strength per UE 20, the received signal strength of the beams may be added together. Also, for each index of the specific beams of the specific APs 11 included in the feedback information, measurement of the narrow beams corresponding to the wide beam in order from the lowest summed received signal strength is determined to not be performed. Thus, for a best wide beam indicating a received signal strength with a high probability of obtaining a high beam gain per UE 20, the narrow beams can be measured, and from among the wide beams reported to be the best wide beam from the fewer UEs 20, the wide beams with a lower received signal strength can be preferentially not measured.

Then, when it is determined to measure the narrow beams corresponding to less than the predetermined number of wide beams in the second beam measurement, in S704, second schedule information including the beam index of the APs 11 to be measured and the parameters that can identify the timing of the transmission of the reference signals using the narrow beams of the APs 11 is reported (S704). The UEs 20 identify the timing of transmission of the reference signals on the basis of the received second schedule information.

Next, in S705, the central processing unit 10 transmits the reference signals using the narrow beams using the parameters reported in S704.

Next, in S706, the central processing unit 10 obtains the second feedback information including the measurement result of the reference signals transmitted in S705 from the UEs 20. Accordingly, in S707, the central processing unit 10 can determine the narrow beams to use in the data transmission per UE 20 and report the narrow beams to the UE 20 in time period 407.

As described above, the central processing unit according to the present embodiment transmits, in the second beam measurement, the narrow beams corresponding to some of the wide beams from among the wide beam request to be transmitted in the second beam measurement from the UEs 20 on the basis of the feedback result of the first beam measurement obtained from the UEs 20. Accordingly, the measurement time of the narrow beams in the second beam measurement can be reduced.

Second Embodiment

Research has been performed (NPL 1) into techniques for reducing the number of analog-digital converters (ADC) provided in the AP 11 while ensuring beam gain to the UE 20 using hybrid beamforming combining analog beamforming and digital beamforming in the AP 11. With hybrid beamforming, the number of the RF chains is less than the number of beams formable by the antennas. This can suppress the wireless circuit size of the AP 11 while maintaining beam gain and can reduce the power consumption. Accordingly, the cost of the AP 11 can be reduced.

In a case where the AP 11 performs hybrid beamforming, the maximum number of the UEs 20 that can simultaneously transmit and receive via the plurality of APs 11 corresponds to the total number of the RF chains provided in the plurality of APs 11. This is because, in a CF MIMO system, data is transmitted simultaneously to one or more UEs 20 via data streams allocated to RF chains of the plurality of APs 11 within a linkable predetermined range. On the other hand, since the number of beams formable by the antennas provided in the AP 11 is greater than the number of the RF chains, the amount of time taken for the beam measurement with respect to the number of the UEs 20 that can simultaneously communicate is longer than in a known analog beamforming system. Thus, on the basis of the number of the RF chains provided in each AP 11, the central processing unit 10 according to the present embodiment restricts the narrow beams to be measured by the UEs 20 in the second beam measurement from among the narrow beams corresponding to the wide beams reported in the first beam measurement from the UEs 20. This reduces the amount of time needed for the second beam measurement. Note that configurations, functions, and processing that are similar to that of the first embodiment are given the same reference sign and description thereof will be omitted.

Figure 8:
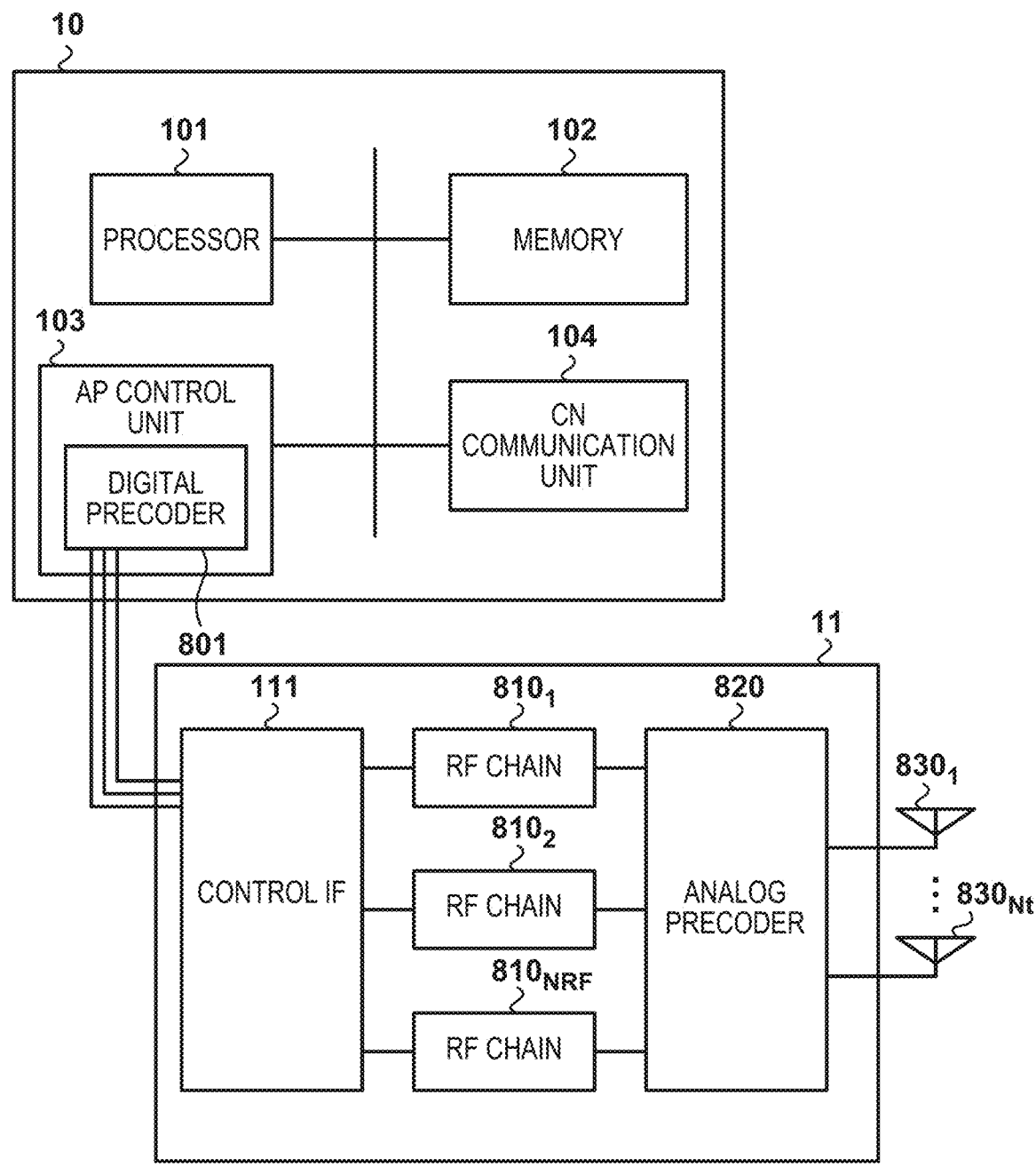
FIG. 8 is a diagram illustrating the configuration of a central processing unit and an access point according to a second embodiment.

FIG. 8 illustrates the configuration of the central processing unit 10 and the AP 11 according to the present embodiment.

The central processing unit 10 includes a digital precoder 801 in the AP control unit 103. Thus, a predetermined data stream can be allocated to a wireless channel using a superimposed wireless signal transmit from the plurality of APs 11 by the UEs 20.

Also, the AP 11 includes a predetermined number $N_{RF}$ of RF chains $810_1$ to $810_{N_{RF}}$ (hereinafter, also referred to without distinction as RF chain 810) and is connected to a predetermined number $N_t$ of antennas $830_1$ to $830_{N_t}$ (hereinafter, also referred to without distinction as antenna 830) via an analog precoder 820. Note that $N_t \gg N_{RF}$. In the present embodiment, the number of the RF chains 810 corresponds to the number of data streams. In other words, the number of the UEs 20 that can simultaneously communicate is restricted by the number of the RF chains 810.

In this example, to search for an analog beam, the best beams between all of the APs 11 and the UEs 20 and the received power value is required. Thus, a large amount of time is required for beam sweeping. Thus, the central processing unit 10 according to the present embodiment divides the search for analog beams between the APs 11 and the UEs 20 into two stages. For example, in the first measurement, a plurality of analog beams (narrow beams) collectively as a wide beam simultaneously transmit reference signal, and only the best wide beams included in feedback from the UEs 20 transmit the reference signal in order of the plurality of analog beams included in the wide beam. Thus, the best analog beam between the APs 11 and the UEs 20 can be identified. Note that in a case where the corresponding relationship between the wide beams and the narrow beams is set in advance, the reference signals may not be simultaneously transmitted using the plurality of narrow beams, and the analog precoder 820 may switch between the wide beams and the narrow beams. In other words, the wide beams may be formed by adding together the narrow beams, and the different beams due to beam width control may be allocated to wide beam and narrow beam.

Figure 9:
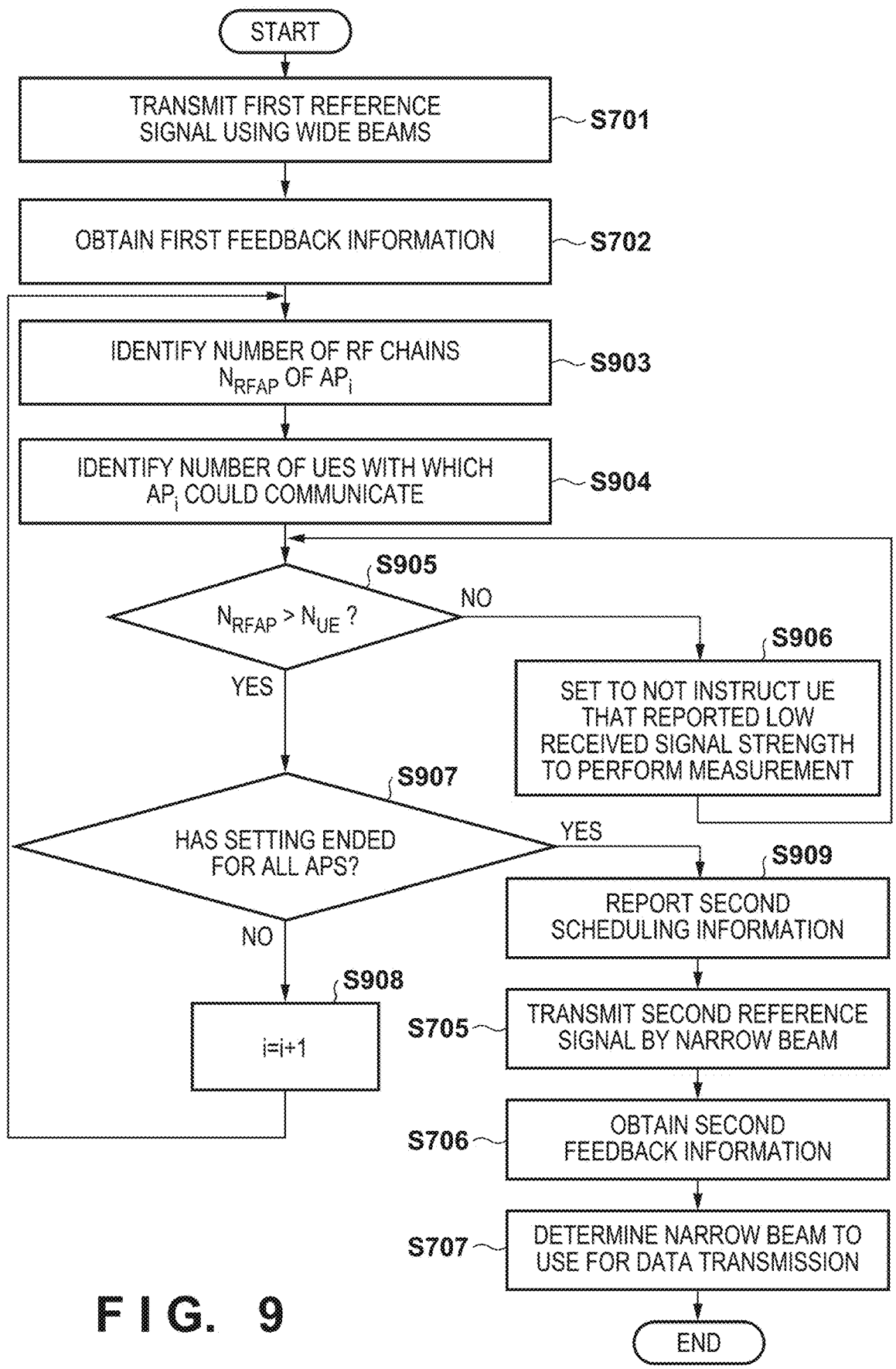
FIG. 9 is a diagram illustrating an example of processing executed by the central processing unit according to the second embodiment.

FIG. 9 illustrates an example of the processing executed by the central processing unit 10 according to the present embodiment. The processing illustrated in FIG. 9 is implemented by the processor 101 of the central processing unit 10 executing a program stored in the memory 102.

Note that as in the first embodiment, the central processing unit 10 broadcasts first schedule information relating to the schedule of beam transmission in a predetermined time interval and a feedback condition instructing of feedback timing. Also, the first schedule information may include the number of wide beams to be measured and the reference signal transmission interval, and the feedback condition may include information instructing of a threshold for the signal strength of wide beam fed back by the UEs 20.

The processing of S701 and S702 is similar to that in the first embodiment and thus will not be described. Note that for narrow beams corresponding to the wide beams of the APs 11 included in the feedback information obtained in S702, at the point in time of S702, all are set to be measured in the second beam measurement. For example, the beam index and the identification information of the UEs 20 to perform measurement are associated together and stored.

Next, in S903, the central processing unit 10 obtains information indicating the number of the RF chains included in AP 11i (AP$_i$). For example, AP$_i$ may report the number of the RF chains provided in the AP$_i$ to the central processing unit 10 when connecting to the central processing unit 10.

Next, in S904, the central processing unit 10 identifies the number of the UEs 20 that report the wide beams formed by the AP$_i$ to be the best wide beams and the received signal strength of the reported beams on the basis of the feedback information received from the UEs 20. Accordingly, the number of the UEs 20 for transmitting and receiving wireless signals can be identified per AP 11.

Next, in S905, it is determined whether or not the number ($N_{UE}$) of UEs 20 with feedback that the wide beams used in the transmission of the reference signal by the AP$_i$ are the best wide beams is less than the number ($N_{RFAP}$) of the RF chains of the AP 11. In a case where the number $N_{UE}$ of the UEs 20 with feedback of the received strength of the beams transmitted by the AP 11 is less than the number $N_{RFAP}$ of the RF chains (YES in S905), the AP 11 can form an analog beam for the UEs 20. Thus, the central processing unit 10 determines not to reduce the number of beams to be measured in the second beam measurement for the AP 11. Then, the processing proceeds to S907, and it is determined whether or not the determination of whether or not the number of the UEs 20 to perform beam measurement is less than the number of the RF chains of the AP 11 is complete for all of the APs 11. In a case where there is still an AP for which the processing of S905 to S906 has not been executed (NO in S907), the processing of S903 to S906 is executed for the next AP 11. In a case where the number of the UEs 20 to perform beam measurement is less than the number of the RF chains of the AP 11 for all of the APs 11 (YES in S907), the processing of S909 onward is executed.

On the other hand, in a case where the number of the UEs 20 with feedback of the received strength of the wide beams transmitted by the APs 11 is equal to or greater than the number of RF chains (NO in S905), the central processing unit 10 advances the processing to S906, and it is determined to not allocate RF chains to the UEs 20 that reported low received signal strength from among the feedback information from the UEs 20 for the AP 11. In other words, an improvement in throughput can be expect by allocating RF chains to other UEs 20 as opposed to the UEs 20 that reported the lowest received signal strength. Thus, the second beam measurement instruction is not issued for the AP 11. Accordingly, even when the second beam measurement is performed, it can be made that the UEs 20 with a relatively low possibility of finding a narrow beam from which a high beam gain can be obtained do not perform the second beam measurement.

Note that in S906, from the feedback information from the UEs 20 for the predetermined AP 11, per beam index of the wide beams of the AP 11, the received signal strength of the UEs 20 are added together, and it may be determined to not measure the reference signals using the narrow beams corresponding to the wide beams in order of lowest summed received signal strength. Thus, from among the wide beams reported to be the best beams from a larger number of the UEs 20, the wide beams with higher received signal strength can be preferentially measured. Also, from among the UEs 20 that transmitted feedback information for the wide beams determined to perform second beam measurement for, it may be determined to not allocate RF chains to the UEs 20 that reported a low received signal strength. Accordingly, the number of the narrow beams measured in the second beam measurement can be reduced, and the UEs 20 allocated to the RF chain can be restricted. In a case where it is determined to not allocate to the RF chains, in the second beam measurement, by not measuring the reference signals of the narrow beams corresponding to the wide beams not allocated to the UEs 20, the amount of time needed for a feedback report can be reduced, and the power consumption of the UEs 20 can be reduced.

When the processing of S906 ends, the central processing unit 10 returns the processing to S905 and determines whether or not the number of the UEs 20 with feedback of the wide beams transmitted by the AP 11 is less than the number of RF chains of the AP 11.

By repeating the processing of S904 to S906 for all of the APs 11, The UEs 20 with more than the number of UEs 20 that can be allocated with a data stream from the AP 11 can be made to not measure the reference signals of the narrow beams for the AP 11. Thus, the RF chains can be allocated to the UEs 20 at the beam measurement stage on the basis of the second beam measurement with a greater number compared to the RF chains.

When a number of the UEs 20 less than the number of possible RF chain allocations are allocated for all of the APs 11, the central processing unit 10 reports the second schedule information that can identify the beam index of the APs 11 to be measured in the second beam measurement and the timing to transmit the reference signals using the narrow beams of the AP 11 to each UE 20 (S909). The processing of S705 to S707 after S909 is similar to that in the first embodiment and thus will not be described.

As described above, the central processing unit according to the present embodiment transmits, in the second beam measurement, the narrow beams corresponding to some of the wide beams from among the wide beam request to be transmitted in the second beam measurement from the UEs 20 on the basis of the feedback result of the first beam measurement obtained from the UEs 20. In this example, the wide beams corresponding to the narrow beams to be measured in the second beam measurement are restricted on the basis of the number of the RF chains provided in the AP 11. Accordingly, the measurement time of the narrow beams in the second beam measurement can be reduced, and the possibility of the UE 20 with a low possibility of being targeted with an analog beam from the AP 11 upon data transmission performing the measurement of a beam formed by the AP 11 can be reduced.

Also, as described above, the central processing unit 10 according to the present embodiment in the beam measurement allocates RF chains to the UEs 20 with feedback of a high received signal strength. Thus, in the subsequent data transmission, the throughput of the wireless communication system 1 can be improved.

Third Embodiment

In the third embodiment, an example of processing will be described in which the central processing unit restricts the beams to be measured on the basis of the number of data streams that the UE can simultaneously transmit and receive data on. Note that configurations, functions, and processing that are similar to that of the first and second embodiment are given the same reference sign and description thereof will be omitted.

Figure 10A:
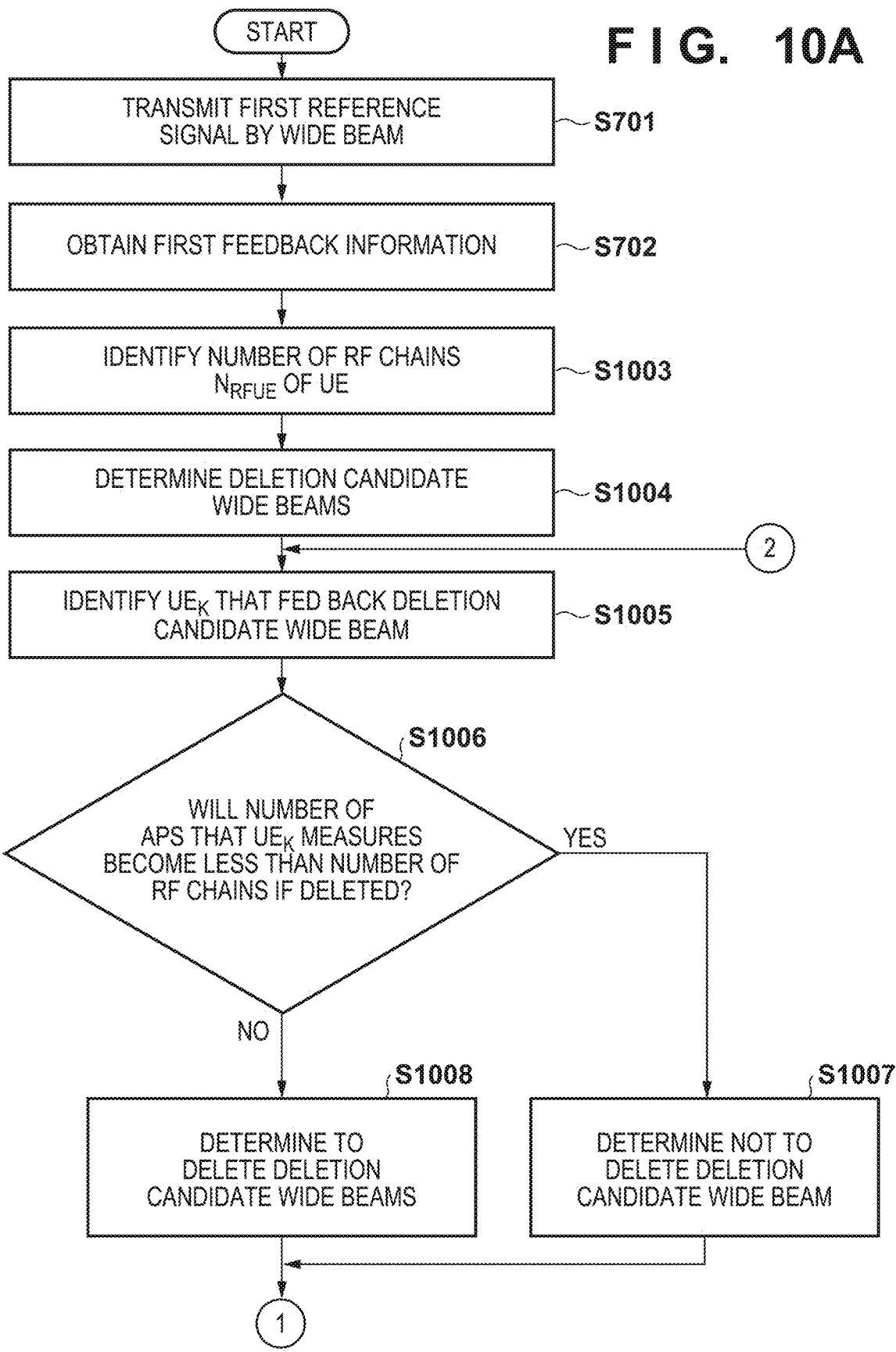
FIG. 10A is a diagram illustrating an example of processing executed by a central processing unit according to a third embodiment.
Figure 10B:
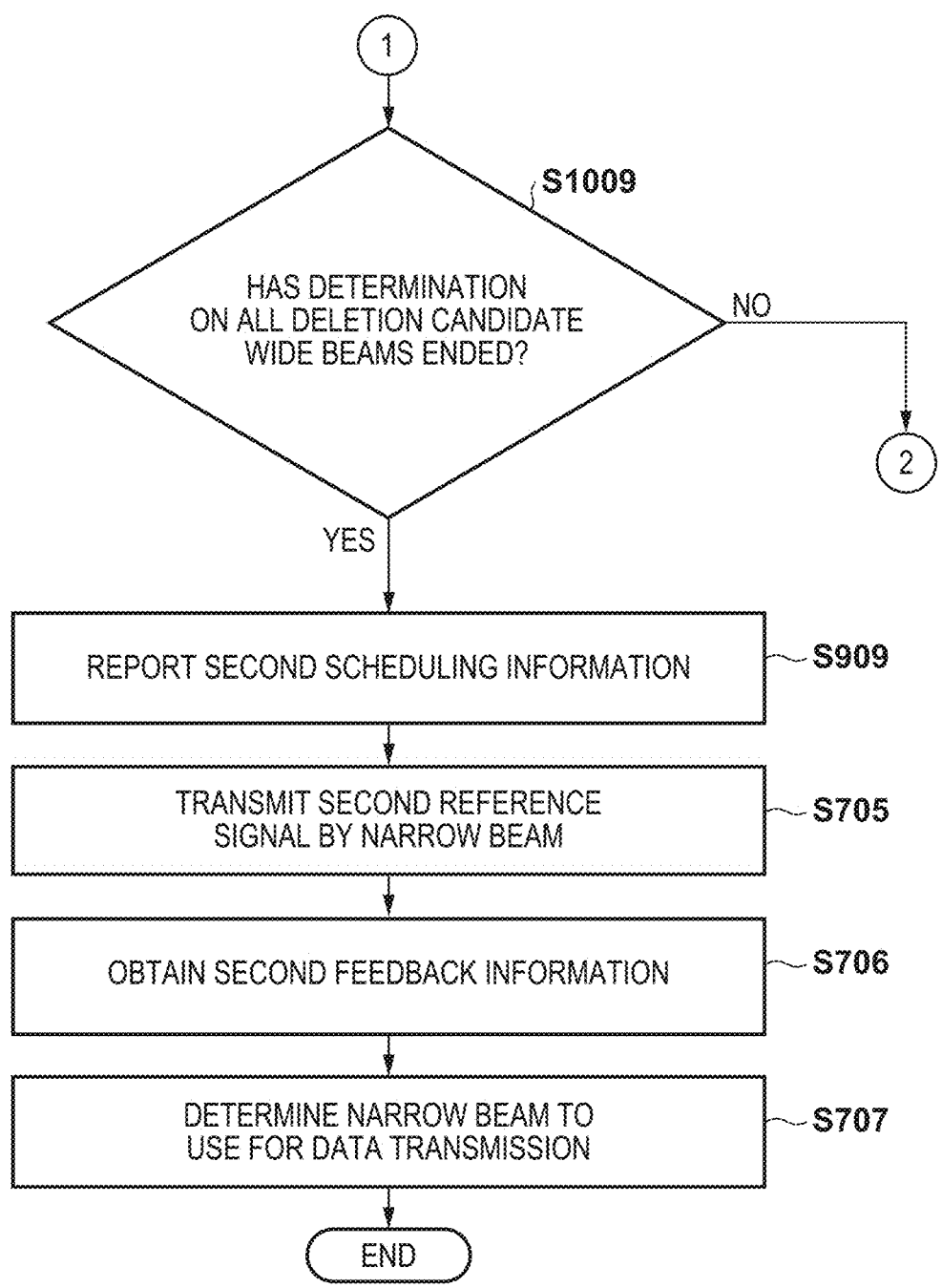
FIG. 10B is a diagram illustrating an example of processing executed by the central processing unit according to the third embodiment.

FIGS. 10A and 10B are diagrams illustrating an example of processing executed by the central processing unit 10 according to the present embodiment.

S701 and S702 are similar to that in the first embodiment and thus will not be described. Note that when transmitting feedback of the first beam measurement, the UE 20 according to the present embodiment reports to the central processing unit 10 the number of the RF chains as the number of data streams that the UE 20 can simultaneously transmit and receive data on. For example, the UE 20 determines the number of the best wide beams of the APs 11 included in the feedback report according to the number of the RF chains. For example, the UE 20 reports a number of the best wide beams of the APs 11 which is twice the number of the RF chains provided in the UE 20. Accordingly, in S1003, the central processing unit 10 can identify the number of the RF chains provided in the UE 20 on the basis of the number of the best wide beams of the APs 11 included in the feedback report. Alternatively, the UE 20 may report the number of the RF chains provided in the UE 20 to the central processing unit 10 via the control channel.

Next, in S1004, the central processing unit 10 determines the wide beam deletion candidates on the basis of the first feedback information received from the UEs 20. In S1004, as in the first embodiment, the received signal strengths received from the UEs 20 per beam index are added together, and the deletion candidate may be determined in order of the lowest summed received signal strength. When a wide beam is deleted, the central processing unit 10 does not transmit the second reference signal using the narrow beams corresponding to the deleted wide beam.

Next, the central processing unit 10 advances the processing to S1005 and identifies the UE 20 ($UE_k$) with the feedback of the best wide beam being the deletion candidate wide beam. Then, in a case where the deletion candidate wide beam has been deleted, the central processing unit 10 determines whether or not the number of the APs 11 measured by the $UE_k$ identified in S105 is less than the number of the RF chains of the $UE_k$ (S1006). In a case where the number of the APs 11 measured by the $UE_k$ is less than the number of the RF chains of the $UE_k$ (YES in S1006), measurement of the narrow beams corresponding to the wide beam is omitted, leading to a possibility that the throughput in the subsequent data transmission by the $UE_k$ may not be improved. Thus, it is determined to not delete the beam (S1007), and the processing proceeds to S1009.

In a case where the number of the APs 11 measured by the $UE_k$ is not less than the number of the RF chains of the $UE_k$ (NO in S1006), even when the measurement of the narrow beams corresponding to the deletion candidate wide beam is omitted, the throughput in the subsequent data transmission by the $UE_k$ via the beams between the other APs 11 can be improved. Thus, it is determined to delete the beam (S1007), and the processing proceeds to S1009.

In S1009, the central processing unit 10 determines whether or not determination for whether or not to delete has been performed for all of the deletion candidate wide beams. In a case where determination for all of the deletion candidate wide beams has not ended (NO in S1009), the central processing unit 10 returns the processing to S1005 and repeats the processing of S1005 to S1008.

In a case where the central processing unit 10 determines that whether or not to delete has been performed for all of the deletion candidate wide beams has been determined (YES in S1009), the central processing unit 10 advances the processing to S909. The subsequent processing is similar to that in FIG. 9 and thus will not be described.

In this manner, by determining to not measure in the second beam measurement, a reduction to the throughput of the specific UE 20 can be prevented, and the amount of time needed for the second beam measurement can be reduced.

Other Embodiments

The invention is not limited to the foregoing embodiments, and various variations/changes are possible within the spirit of the invention.

The user equipment according to the present embodiment described above reports wide beams that received reference signals with the highest received signal strength per access point. However, in one example, the user equipment may feed back a plurality of received signal strengths of reference signals received at different timing from a plurality of wide beams of one access point to the central processing unit. Also, on the basis of the fed back plurality of wide beams, the identification information of a plurality of narrow beams may be transmitted to the central processing unit 10 in order of the highest received signal strength of the reference signal transmitted using the narrow beams corresponding to the plurality of wide beams. In this manner, feedback information relating to a plurality of narrow beams for transmitting and receiving data using a plurality of narrow beams from one access point can be provided to the central processing unit 10. Also, the user equipment may transmit the difference in signal strength from the strongest wide beam for each of the plurality of wide beams.

What is claimed is:

1. A control apparatus that controls beam search processing between a dispersed plurality of communication apparatus and a plurality of user equipment, the control apparatus comprising:
   first instructing unit configured to instruct a communication apparatus to transmit a plurality of first reference signals using different parameters using a plurality of first beams formable by the apparatus;
   first obtaining unit configured to obtain, from each of the plurality of user equipment, first feedback information including a combination of identification information of one or more first beams and received signal strength in order of highest received signal strength of the first reference signals for each of the plurality of user equipment from among the plurality of first beams used in transmission of the first reference signals by the communication apparatus;
   first determining unit configured to, in a case where a predetermined number or greater of identification information of different first beams is included in a plurality of the first feedback information obtained from the plurality of user equipment by the first obtaining unit, determine first beams of a number fewer than the predetermined number to use in measuring second reference signals from among first beams of the predetermined number or greater; and
   first reporting unit configured to report, to the plurality of user equipment, a parameter of the second reference signals transmitted using a plurality of second beams that correspond to the first beam of a number fewer than the predetermined number determined to use in measuring by the first determining unit and that have a narrower beam width than the first beams.

2. The control apparatus according to claim 1, wherein the first determining unit, per the identification information, selects the first beam of a number less than the predetermined number in order of a highest number included in the plurality of first feedback information obtained from the plurality of user equipment and determines to measure the second reference signals using second beams corresponding to the first beams of a number less than the predetermined number.

3. The control apparatus according to claim 1, wherein the first determining unit, per the identification information, adds together received signal strengths of the first reference signals included in the plurality of first feedback information obtained from the plurality of user equipment, selects the first beam of a number less than the predetermined number in order of the highest summed received signal strength, and determines to measure the second reference signals using second beams corresponding to the first beams of a number less than the predetermined number.

4. The control apparatus according to claim 1, further comprising
   first identifying unit configured to identify a data stream number that the communication apparatus can simultaneously transmit and receive data on,
   wherein the first determining unit determines for measurement of the second reference signals to be performed using the second beams corresponding to the first beams of a number less than the data stream number identified by the first identifying unit.

5. The control apparatus according to claim 1, further comprising
   second identifying unit configured to obtain a data stream number that each of the plurality of user equipment can simultaneously transmit and receive data on,
   wherein the first determining unit selects a first beam of the communication apparatus so that each of the plurality of user equipment measures a reference signal transmitted from a number of the plurality of communication apparatus equal to or greater than the data stream number identified by the second identifying unit and determines for measurement of the second reference signals to be performed using the second beams corresponding to the first beams of a number less than the predetermined number.

6. The control apparatus according to claim 1, further comprising
   second reporting unit configured to report a parameter of the first reference signals transmitted using the plurality of first beams to the plurality of user equipment.

7. The control apparatus according to claim 1, wherein the first reporting unit associates together and reports, as the parameter of the second reference signals, identification information of a predetermined second beam and identification information of a user equipment instructing to measure the second reference signals transmitted using the predetermined second beam.

8. The control apparatus according to claim 1, wherein the first reporting unit reports a timing for transmitting the second reference signals as the parameter of the second reference signals.

9. The control apparatus according to claim 1, further comprising
   second obtaining unit configured to obtain second feedback information including a combination of identification information of one or more second beams in order of highest received signal strength of the second reference signals for each of the plurality of user equipment from among the plurality of second beams used in transmission of the second reference signals by the communication apparatus and the received signal strengths.

10. The control apparatus according to claim 9, further comprising:
    second determining unit configured to determine a second beam to use in transmission between at least one of the plurality of user equipment and the communication apparatus on a basis of the second feedback information obtained by the second obtaining unit.

11. The control apparatus according to claim 1, wherein the first obtaining unit obtains first feedback information including a combination of a different in received strength with a received signal strength of a first reference signal with a highest received signal strength for a predetermined user equipment from among the plurality of first reference signals transmitted by the communication apparatus and identification information of a first beam used in transmission of the first reference signal.

12. A user equipment that measures a beam transmitted from a dispersed plurality of communication apparatuses controlled by a control apparatus, the user equipment comprising:
    first measuring unit configured to measure received signal strength of a plurality of first reference signal transmitted using a plurality of first beams formable by a predetermined communication apparatus from among the plurality of communication apparatuses;

transmitting unit configured to transmit, to the control apparatus, first feedback information including a combination of identification information of a first beam used in transmission of one or more of the first reference signals in order from highest received signal strength for the user equipment from among the plurality of first reference signals measured by the first measuring unit and received signal strength;

receiving unit configured to receive, from the control apparatus, a parameter of second reference signals transmitted using a plurality of second beams that correspond to a first beam and that have a narrower beam width than the first beam; and second measuring unit configured to measure received signal strength of the second reference signals transmitted using the second beams by the communication apparatus in a case where the parameter of the second reference signals received by the receiving unit includes a parameter of a second reference signal transmitted using a second beam corresponding to the first beam included in the first feedback information.

13. A control method executed by a control apparatus that controls beam search processing between a dispersed plurality of communication apparatus and a plurality of user equipment, the control method comprising:

instructing a communication apparatus to transmit a plurality of first reference signals using different parameters using a plurality of first beams formable by the communication apparatus;

obtaining, from each of the plurality of user equipment, first feedback information including a combination of identification information of one or more first beams and received signal strength in order of highest received signal strength of the first reference signals for each of the plurality of user equipment from among the plurality of first beams used in transmission of the first reference signals by the communication apparatus;

in a case where a predetermined number or greater of identification information of different first beams is included in a plurality of the first feedback information obtained from the plurality of user equipment, determining first beams of a number fewer than the predetermined number to use in measuring second reference signals from among first beams of the predetermined number or greater; and reporting, to the plurality of user equipment, a parameter of the second reference signals transmitted using a plurality of second beams that correspond to the first beam of a number fewer than the predetermined number determined to use in measuring and that have a narrower beam width than the first beams.

14. A non-transitory computer-readable storage medium storing a program for causing a computer of a control apparatus that controls beam search processing between a dispersed plurality of communication apparatus and a plurality of user equipment to execute:

a first instructing step of instructing a communication apparatus to transmit a plurality of first reference signals using different parameters using a plurality of first beams formable by the communication apparatus;

a first obtaining step of obtaining, from each of the plurality of user equipment, first feedback information including a combination of identification information of one or more first beams and received signal strength in order of highest received signal strength of the first reference signals for each of the plurality of user equipment from among the plurality of first beams used in transmission of the first reference signals by the communication apparatus;

a first determining step of, in a case where a predetermined number or greater of identification information of different first beams is included in a plurality of the first feedback information obtained from the plurality of user equipment in the first obtaining step, determining first beams of a number fewer than the predetermined number to use in measuring second reference signals from among first beams of the predetermined number or greater; and a first reporting step of reporting, to the plurality of user equipment, a parameter of the second reference signals transmitted using a plurality of second beams that correspond to the first beam of a number fewer than the predetermined number determined to use in measuring in the first determining step and that have a narrower beam width than the first beams.

\* \* \* \* \*